United States Patent [19]

MacGregor et al.

[11] Patent Number: 5,047,074
[45] Date of Patent: Sep. 10, 1991

[54] PURGING OF NITROGEN FROM NATURAL GAS

[76] Inventors: Douglas MacGregor, P.O. Box 7025, Salt Lake City, Utah 84107; Page P. Blakemore, Sr., 4735 Naniloa Dr., Salt Lake City, Utah 84117

[21] Appl. No.: 445,789

[22] Filed: Dec. 4, 1989

Related U.S. Application Data

[63] Continuation-in-part of Ser. No. 301,396, Jan. 25, 1989, abandoned.

[51] Int. Cl.$^5$ .............................................. B01D 19/00
[52] U.S. Cl. ........................................ 55/48; 55/55; 55/87; 62/17
[58] Field of Search ................... 62/17; 55/55, 48, 87; 423/210, 245.1

[56] References Cited

U.S. PATENT DOCUMENTS

| | | | |
|---|---|---|---|
| 2,521,233 | 9/1950 | Latchum, Jr. .................... | 183/115 |
| 2,596,785 | 5/1952 | Nelly, Jr. et al. .................... | 48/190 |
| 2,661,812 | 12/1953 | Gilmore .......................... | 183/115 |
| 2,689,624 | 9/1954 | Davis ............................. | 183/115 |
| 2,726,191 | 12/1955 | Mannas .......................... | 196/8 |
| 2,748,180 | 5/1956 | Webber ........................ | 260/683.3 |
| 2,970,451 | 2/1961 | Ehrlich et al. ...................... | 62/17 |
| 3,977,203 | 8/1976 | Hinton et al. ..................... | 62/17 |
| 4,305,733 | 12/1981 | Scholz et al. .................... | 48/196 R |
| 4,623,371 | 11/1986 | Mehra ........................... | 62/17 |
| 4,797,140 | 1/1989 | Landeck et al. .................. | 55/48 |
| 4,832,718 | 5/1989 | Mehra ........................... | 62/17 |

OTHER PUBLICATIONS

Handbook of Natural Gas Engineering, Donald L. Katz et al.; McGraw Hill, N.Y., 1959; pp. 512, 513, and 532.
Industrial and Engineering Chemistry, vol. 23; No. 5, May 1931, K. Fralich et al.; pp. 548–550.

*Primary Examiner*—Bernard Nozick

[57] ABSTRACT

Natural gas admixed with nitrogen is flowed through an absorber at approximately 250–300 psia and at ambient temperature. An absorbent comprised primarily of a petroleum base fluid having a low vapor pressure and a high boiling point is flowed countercurrently through the absorber. The natural gas is absorbed preferentially to the nitrogen in the absorbent. The nitrogen is exhausted from the absorber. The rich absorbent is flowed into a desorber through a regulator reducing the pressure to approximately 65 psia, thus effecting desorption of the natural gas. The desorbed natural gas is then flowed to market. The lean absorbent is repressurized and recycled to the absorber. Two or more absorbers may be connected in series.

11 Claims, 1 Drawing Sheet

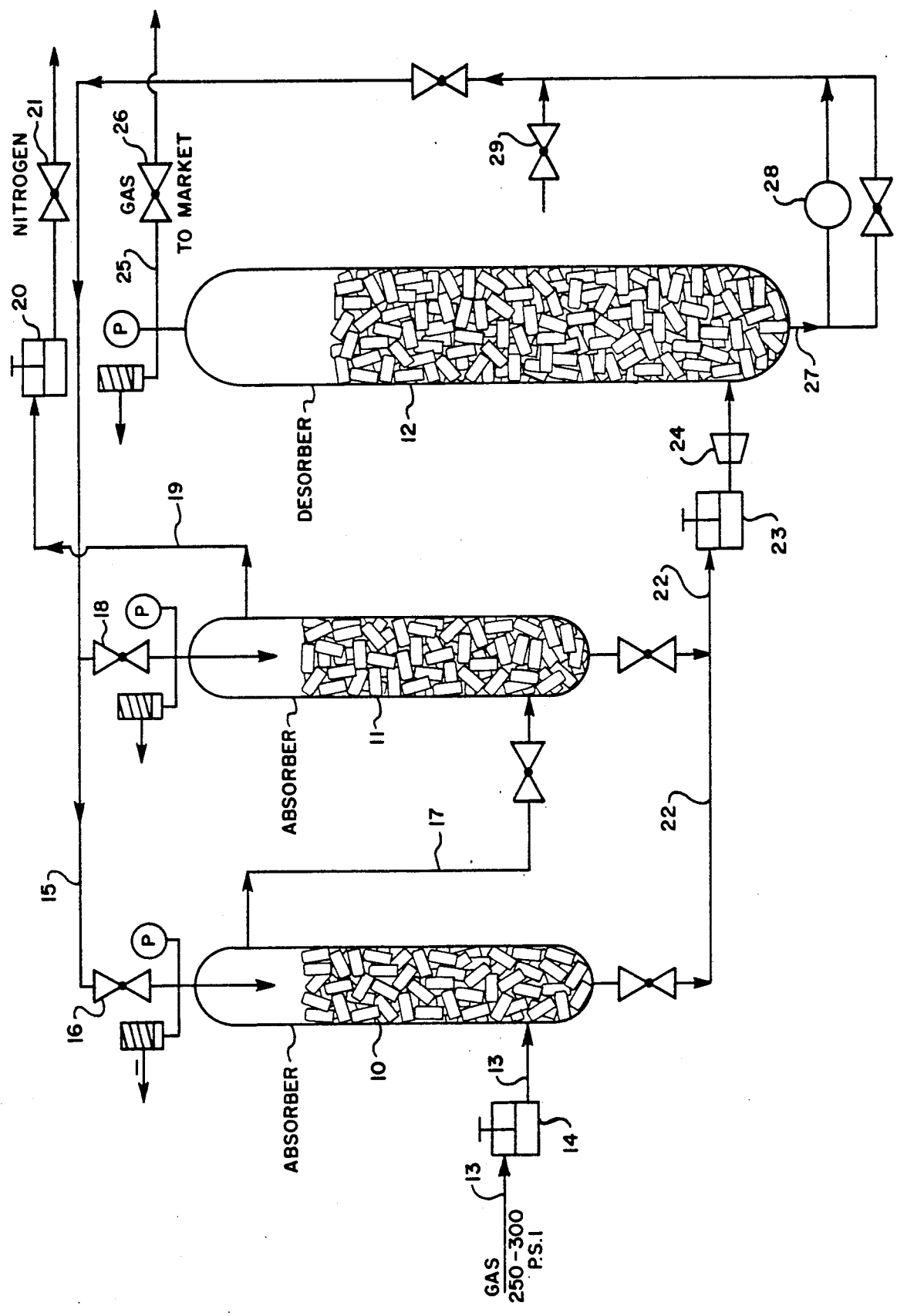

PURGING OF NITROGEN FROM NATURAL GAS

RELATED APPLICATION

This is a continuation-in-part of my copending application Ser. No. 301,396 filed Jan. 25, 1989 now abandoned.

BACKGROUND OF THE INVENTION

1. Field

The invention is in the field of gas purification.

2. State of the Art

Natural gas at the well-head is usually admixed with undesirable impurities such as water, hydrogen sulfide, carbon dioxide, and nitrogen. Prior to introduction of the gas into a pipeline it is normally necessary to decrease the amount of such impurities to prescribed values. Nitrogen is not a problem in most natural gas fields, since it is usually present in only small quantities that are well below the prescribed value. However, in some fields objectionable quantites of nitrogen are present, such as the Westbrook field in Texas, the Pennsylvania reservoirs in Oklahoma, some fields in the Texas Panhandle, and some others.

The usual procedure for purging nitrogen from the natural gas stream consists of an absorption/desorption process wherein the natural gas is flowed countercurrently to an absorbent which preferentially absorbs the nitrogen as compared to the hydrocarbons in the natural gas. Thus, at least a partial separation of the nitrogen and the natural gas is achieved.

One such procedure employs liquid ammonia as an absorbent which preferentially absorbs nitrogen as described in U.S. Pat. No. 2,521,233. However, this procedure is costly and hazardous since it involves the use of liquid ammonia, low temperatures in the range of $-30°$ F. to $-100°$ F., and high pressures in the range of 700 psia.

Another procedure is that described in U.S. Pat. No. 3,977,203, wherein nitrogen along with other impurities is removed by a liquid/liquid extraction process using a polar solvent. This process is also very costly since it involves a great deal of expensive equipment.

Still another procedure is that described in U.S. Pat. No. 4,832,718, wherein the natural gas is dissolved in a solvent and the solution is later flashed to effect separation. However, the solvent disclosed has a relatively high vapor pressure thus leading to excessive loss or, alternatively, requiring an additional recovery operation.

Other procedures employed in the prior art have relied upon the use of temperatures either significantly higher or lower than ambient, pressures abnormally high, costly equipmeent, and/or secondary purge gas extraction.

It was not previously recognized that by using an essentially inverse process, whereby the desired product, i.e., natural gas, was absorbed in an absorbent preferentially as compared to nitrogen, and recovered by desorption, and wherein the absorbent had a very low vapor pressure and a high boiling point, that sucessful purging of the nitrogen could be achieved utilizing only ambient temperature, modest pressures, and simple inexpensive equipment.

Therefore, it was an object in the making of the invention to provide a process whereby nitrogen could be substantially purged from the natural gas stream utilizing only simple inexpensive equipment, and which would not involve the use of cryogenic temperatures, high temperatures, abnormally high pressures, nor the use of an absorbent subject to excessive loss during the cycle.

SUMMARY OF THE INVENTION

In accomplishing the foregoing objectives and in accordance with the invention, the natural gas containing nitrogen is flowed upwardly and countercurrently to a liquid absorbent in an absorber. The gas and absorbent are flowed into the absorber at a pressure of approximately 250-300 psia and at ambient or lower temperature. The absorbent is composed predominantly of a petroleum base fluid having a bery low vapor pressure and a relatively high boiling point as compared to the usual hydrocarbons. The absorbent absorbs the group of light hydrocarbons (having one to five atoms of carbon in each molecule) present in the natural gas stream preferentially as compared to the admixed nitrogen. The non-absorbed gas, composed predominantly of nitrogen but with some natural hydrocarbon gas admixed with it, is flowed out of the top of the absorber. The rich absorbent, containing the absorbed light hydrocarbons is flowed through a pressure reducing valve to a desorber operating at a pressure of approxiamtely 65 psia, where desorption occurs. The desorbed gas, consisting primarily of light hydrocarbons with a small amount of nitrogen, is flowed from the desorber to market. The lean absorbent is flowed out of the desorber, repressurized, and recycled back into the absorber.

The absorber and desorber are preferably steel cylindrical vessels containing appropriate packing material. A foam-controlling means to inhibit objectionable foaming is incorporated in the feed line between the absorber and the desorber following the pressure reducer. Such means may be a tapered honeycomb.

Two or more absorbers may be connected sequentially prior to the desorber in order to minimize loss of natural gas with the purged nitrogen. In this arrangement the non-absorbed gas from an absorber is flowed into a succeeding absorber and the rich absorbent from each absorbent flowed into the desorber.

THE DRAWING

The best mode presently contemplated for carrying out the invention is shown in the acccompanying schematic drawing in which the single FIGURE is a schematic representation of preferred apparatus employed in the process.

DETAILED DESCRIPTION OF THE ILLUSTRATED EMBODIMENT

As shown, the apparatus includes an absorber 10, an absorber 11, and a desorber 12. The absorber and the desorber are preferably cylindrical tanks of steel containing packing. The packing material and shape are chosen so as to provide multiple surface areas porous to both gas and the absorbent and substantially incompressible at the pressures and temperature utilized. Typical of commercial packing are so-called "Pall" rings produced by B.A.S.F., Germany, "Flexipack" produced by Koch Engineering Co., Wichita, Kans., and "Rascing" rings produced by Giltsch, Inc., Dallas, Tex.

As shown, natural gas containing nitrogen is introduced at a pressure of approximately 250-300 psia and at ambient temperature by way a pipe 13 and a pressure regulator 14 into the absorber 10 near the bottom of such absorber. Absorbent is introduced into the top of absorber 10 by way of a pipe 15 and through a valve 16. The absorbent preferentially absorbs the light hydrocarbon consitutuents of the natural gas from the nitrogen. The characteristics desired of the absorbent are a very low vapor pressure (preferably less than 0.3 mm. of Hg at 100° F.), a high boiling point (preferably greater than 250° F.), a low pour point (preferably below −50° F.), a low kinematic viscosity (preferably less than 20 centistokes at 60° F.), and a low evaporation loss (preferably less than 20% when tested in accordance with MILITARY SPECIFICATION MIL-H-5606 E, 29Aug. 1980, Paragraph 4.7.2). One such satisfactory absorbent is a fluid having a petroleum base comprised of apoly alpha olefin, which is an unsaturated aliphatic hydrocarbon, formulated according to MILITARY SPECIFICATION MIL-H-5606 E, 29 Aug. 1980, identified by Military Symbol OHA. It has been found desirable to add a foam inhibitor to the absorbent such as Dow Corning 200, a polysilane.

As the gas flows upwardly through the absorber the absorbent flows countercurrently downwardly through the absorber, absorbing primarily the light hydrocarbons of the natural gas, and to a much lesser extent some nitrogen. As result the absorbed gas contains a much higher ratio of light hydrocarbons to nitrogen than did the incoming gas.

The non-abnsorded gas, which is composed primarily of nitrogen with some admixed light hydocarbons, is flowed from the upper region of the absorber 10, through a pipe 17, a second absorber 11 as shown. Concurrently, absorbent is flowed into the top of absorber 11 by way of pipe 15 through a valve 18. Thus, another absorption cycle takes place. The result is that the non-absorbed gas flowing from the top of absorber 11 through a pipe 19 is predominantly nitrogen with very little of the light hydrocarbons admixed therewith. This gas is then flowed through a pressure regulator 20 and a valve 21 to the atmosphere or a to a separate container or process if desired.

The rich absorbent with the absorbed light hydrocarbons is flowed from the bottom od absorbers 10 and 11, through a pipe 22, into descrober 12, passing through a pressure regulator 23 and a foam controller 24.

The pressure regulator reduces the pressure to approxiamtely 65 psia. Foam controller 24 is preferably a tapered honeycomb arrangement with the larger openings downstream of the flow. This arrangement inhibits the occurence of small bubbles of foam.

As the gas pressure is reduced the light hydrocarbons desorb from the absorbent and rise through the desorber, flowing out the top through a pipe 25 and a valve 26 to piping and/or storage tanks for market distribution.

The lean absorbent flows from the bottom of desorber 12 through a pipe 27 into a pump 28, where it is repressurized to approximately 250–325 psia and reintroduced, through pipe 15, into absorbers 10 and 11.

Makeup absorbent is introduced at any convenient location, such as through a valve 29, to compensate for losses which may occur. However, since the absorbent was chosen to have a very low vapor pressure and a high boiling point such losses should be minimal.

It should be noted that if the desorbed gas flowing out of desorber 12 still has a higher content of nitrogen than is desired, the gas may be processed through one or more other absorber/desorber arrangements similar to that described above.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A process for separating one or more of the group of light hydrocarbons containing from one to five carbon atoms in each molecule from nitrogen in a stream of gas containing same, comprising passing such a stream of gas through an absorbtion column at substantially ambient temperature, or below and elevated pressure in intimate contact with an absorbent comprised primarily of a poly alpha olefin, for preferentially absorbing said group of light hydrocarbons with respect to the nitrogen in said gas; passing the non-absorbed gas comprised predominantly of nitrogen out of said absorption colum to waste or to recovery for use or for future processing; passing the resulting rich absorbent containing the absorbed light hydrocarbons into a desorber means operating at substantially ambient temperature but at a pressure lower than that of the absorber means, thus effecting desorption of at least some of the light hydrocarbons; and separately recovering the desorbed light hydrocatbons and the resultant lean absorbent from the desorber.

2. A process according to claim 1, wherein the group of light hydrocarbons is comprised predominantly of methane ($CH_4$) with lesser amounts of other of the group of light hydrocabons admixed therewith.

3. A process according to claim 1, wherein the resultant lean absorbent from the desorber means is represurized and recycled back into the absorber means.

4. A process according to claim 1, wherein the non-absorbed gas is flowed into one or more additional absorbers, prior to the desorber, thus minimizing loss with the nitrogen of the light hydrocarbons.

5. A process according to claim 1, wherein the absorbent is comprised predominantly of a petroleum base fluid having a boiling point greater than 250° F. at atmospheric pressure and a vapor pressure of less than 0.3 mm. of Hg at 100° F.

6. A process according to claim 5, wherein the absorbent has a kinematic viscosity of less than 20 centistokes at temperatures equal to or higher than ambient temperature.

7. A process according to claim 5, wherein the absorbent has a maximum evaporation loss of less than 20%.

8. A process according to claim 5, wherein the pour point of the absorbent is lower than −60° C.

9. A process according to claim 1, wherein foam controlling means is employed to control foaming of the absorbent as the rich absorbent flows from the absorber means into the desorber means.

10. A process according to claim 9, wherein an anti-foaming agent is added to the absorbent to inhibit foaming.

11. A process according to claim 10, wherein the anti-foaming agent is polysilane.

* * * * *